US009836326B2

(12) United States Patent
Smentek et al.

(10) Patent No.: US 9,836,326 B2
(45) Date of Patent: Dec. 5, 2017

(54) CACHE PROBE REQUEST TO OPTIMIZE I/O DIRECTED CACHING

(71) Applicant: Oracle International Corporation, Redwood Shores, CA (US)

(72) Inventors: David Richard Smentek, Cupertino, CA (US); Kathirgamar Aingaran, Mountain View, CA (US); Sumti Jairath, Santa Clara, CA (US); Manling Yang, Santa Clara, CA (US); Serena Wing Yee Leung, San Francisco, CA (US); Paul N. Loewenstein, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 342 days.

(21) Appl. No.: 14/675,351

(22) Filed: Mar. 31, 2015

(65) Prior Publication Data
US 2015/0278092 A1    Oct. 1, 2015

Related U.S. Application Data

(60) Provisional application No. 61/973,061, filed on Mar. 31, 2014.

(51) Int. Cl.
| G06F 12/00 | (2006.01) |
| G06F 9/50 | (2006.01) |
| G06F 12/0817 | (2016.01) |
| G06F 12/0813 | (2016.01) |
| G06F 12/0831 | (2016.01) |

(52) U.S. Cl.
CPC ........ *G06F 9/5016* (2013.01); *G06F 12/0813* (2013.01); *G06F 12/0822* (2013.01); *G06F 12/0831* (2013.01)

(58) Field of Classification Search
CPC ............. G06F 12/0822; G06F 12/0831; G06F 12/0813; G06F 9/5016
See application file for complete search history.

(56) References Cited

U.S. PATENT DOCUMENTS

2007/0156972 A1* 7/2007 Uehara ............... G06F 12/0831
                                                                  711/146

* cited by examiner

*Primary Examiner* — Matthew Bradley
(74) *Attorney, Agent, or Firm* — Osha Liang LLP

(57) ABSTRACT

A method and system for allocating data streams that includes receiving, at an allocator, a data stream. The data stream includes a memory address and data associated with the memory address. The method also includes examining, by the allocator, the data stream to make a determination that the data stream is a soft allocating data stream, and then sending, from the allocator based on the determination, a plurality of write probes to a plurality of caches, wherein each write probe of the plurality of write probes includes at least part of the memory address. Additionally, the method includes receiving, at the allocator in response to a write probe of the plurality of write probes, a cache line present acknowledgement from a cache of the plurality of caches, and directing, by the allocator in response to the cache line present acknowledgement, the data of the data stream to the cache.

20 Claims, 6 Drawing Sheets

CACHE PROBE REQUEST TO OPTIMIZE I/O DIRECTED CACHING

CROSS-REFERENCE TO RELATED APPLICATIONS

Pursuant to 35 U.S.C. §119 (e), this application claims benefit of U.S. Provisional Application No. 61/973,061 filed on Mar. 31, 2014, entitled "CACHE PROBE REQUEST TO OPTIMIZE INPUT/OUTPUT DIRECTED CACHING." The disclosure of the U.S. Provisional Application is incorporated herein by reference in its entirety.

BACKGROUND

Modern computer processors often have associated cache memory. In many common configurations, when not already present in a cache, data from memory is copied to and stored in the cache when a processor seeks to perform an operation (e.g., read, write, etc.) using the data. Once the data has been stored in a cache, the data may be used by using (e.g., accessing, manipulating, modifying, etc.) the copy of the data in the cache, rather than memory, until, for example, the data is evicted from the cache and, if modified, written back to memory. A processor with an attached cache may include functionality to determine if data needed to perform an operation is present in the cache. When data is present in the cache (i.e., a cache hit), the data will be used by the processor to perform the operation. When data is not present in the cache (i.e., a cache miss), the data may be subjected to several operations in order to, at least, copy the data from memory into the cache before a processor may use the data. Data being present in the cache may improve the performance of the processor performing the operation because, for example, cache memory may operate at higher speeds and/or be located physically nearer to the processor than various other types of memory (e.g., main system memory such as random access memory (RAM)) available in a computing device. Therefore, data stored in a cache associated with a given computer processor may be available for use by the processor more quickly than data that must be retrieved from other memory locations, hard drives, and/or caches associated with other processors of a computing device.

Additionally, some devices, or portions thereof, included in and/or operatively connected to a computing device may include functionality to perform operations that read data directly from and/or write data directly to memory (e.g., via direct memory access (DMA) operations). Such operations have the potential to cause cache coherency issues, as copies of data in memory that have been subject, for example, to a DMA operation may no longer align with copies of the data from the memory location in one or more caches of a system. In order to perform an operation using data that has been written to memory by such a device, and to avoid potential cache coherency issues, a processor may need to access the memory location where the data is stored and copy the data to a cache before an operation may be performed using the data.

SUMMARY

In general, in one aspect, embodiments of the invention relate to a method for allocating data streams that includes receiving, at an allocator, a data stream. The data stream includes a memory address and data associated with the memory address. The method also includes examining, by the allocator, the data stream to make a determination that the data stream is a soft allocating data stream, and then sending, from the allocator based on the determination, a plurality of write probes to a plurality of caches, wherein each write probe of the plurality of write probes includes at least part of the memory address. Additionally, the method includes receiving, at the allocator in response to a write probe of the plurality of write probes, a cache line present acknowledgement from a cache of the plurality of caches, and directing, by the allocator in response to the cache line present acknowledgement, the data of the data stream to the cache.

In general, in one aspect, embodiments of the invention relate to a system for allocating data streams that includes a memory and a plurality of caches, where each of the plurality caches is operatively connected to at least one processor. The system also includes an allocator operatively connected to the memory and to the plurality of caches. The allocator is configured to receive a data stream that includes a memory address and data associated with the memory address, examine the data stream to make a determination that the data stream is a soft allocating data stream, and send, based on the determination, a plurality of write probes to the plurality of caches, where each write probe of the plurality of write probes includes at least part of the memory address. The allocator is also configured to receive, in response to a write probe of the plurality of write probes, a cache line present acknowledgement from a cache of the plurality of caches, and direct, in response to the cache line present acknowledgement, the data of the data stream to the cache.

In general, in one aspect, embodiments of the invention relate to a non-transitory computer readable medium comprising instructions, which, when executed by a computer processor, perform a method that includes receiving, at an allocator, a data stream that includes a memory address and data associated with the memory address. The method also includes examining, by the allocator, the data stream to make a determination that the data stream is a soft allocating data stream, and sending from the allocator, based on the determination, a plurality of write probes to a plurality of caches, where each write probe of the plurality of write probes comprises at least part of the memory address. Additionally, the method includes receiving at the allocator, in response to a write probe of the plurality of write probes, a cache line present acknowledgement from a cache of the plurality of caches, and directing, by the allocator, in response to the cache line present acknowledgement, the data of the data stream to the cache.

Other aspects of the invention will be apparent from the following description and the appended claims.

DETAILED DESCRIPTION

Figure 1:
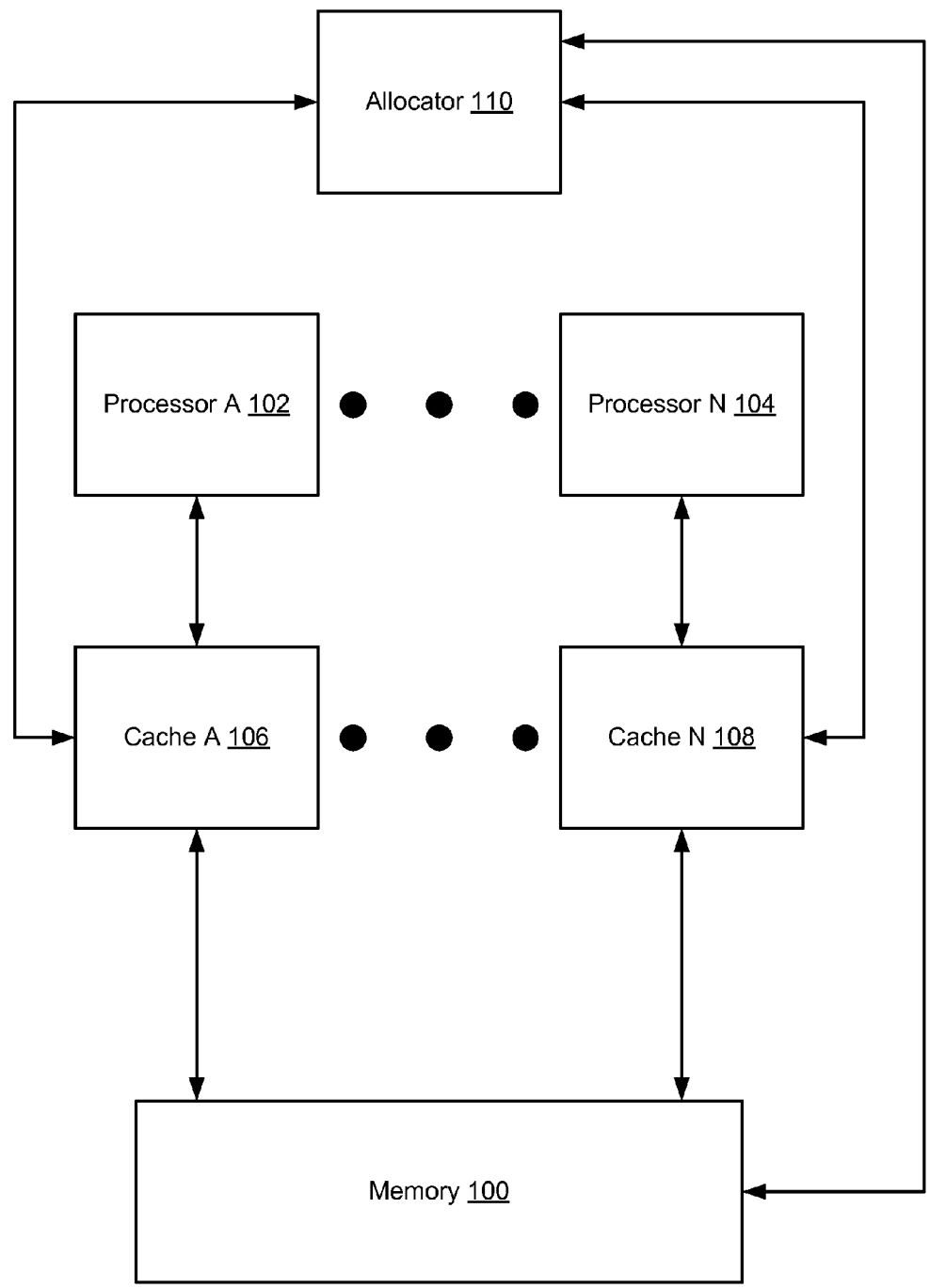
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and system for allocating a data stream to a cache. Specifically, in one or more embodiments of the invention, before writing data of a data stream to memory, an allocator sends one or more write probes to one or more caches to determine if the memory address to which the data is to be written is already present in a cache. If a cache includes the address (e.g., in a cache line), then the allocator may write data of the data stream directly to the cache rather than to memory.

FIG. 1 shows a system in accordance with one or more embodiments of the invention. As shown in FIG. 1, the system includes memory (100), processors (processor A (102), processor N (104)), caches (cache A (106), cache N (108)), and an allocator (110). Each of these components is described below.

In one or more embodiments of the invention, the system includes memory (100). In one or more embodiments of the invention, memory (100) is any hardware configured to store data and/or instructions permanently and/or temporarily. Examples of memory include, but are not limited to, random access memory (RAM), cache memory, flash memory, any other type of memory capable of storing data and/or instructions, and/or any combination thereof. In one or more embodiments of the invention, memory (100) may include multiple different memory units and/or devices. The multiple different memory units and/or devices may or may not be of the same type, located at the same physical site, and/or co-located with one or more operatively connected (e.g., via a cache) processors (e.g., processor A (102), processor N (104)). In one or more embodiments of the invention, the memory (100) is included as a part of the system. In other embodiments of the invention, the memory (100) is stand-alone memory that is operatively connected to and accessed, at least, by the processors (102, 104) of the system. Memory (100) may include functionality to have data written to the memory, read from the memory, and/or any other data operation performed (e.g., copied, moved, manipulated, etc.). Data stored in memory may be used by one or more processors (102, 104) of a computing device (not shown) to perform one or more operations (e.g., read, write, etc.).

In one or more embodiments of the invention, a computing device (not shown) is any device and/or any set of devices capable of electronically processing instructions, and that includes at least the minimum processing power, memory (e.g., random access memory (RAM)), input and output device(s), and/or cache memory in order to perform, at least in part, one or more embodiments of the invention. Examples of computing devices include, but are not limited to, servers (e.g., rack servers, blade-servers in a blade-server chassis, etc.), desktop computers, mobile devices (e.g., laptop computers, smart phones, personal digital assistants, e-readers, tablet computers, or other mobile devices), and/or any other type of computing device with the aforementioned minimum requirements.

As shown in FIG. 1, all caches (106, 108) are connected to a single memory (100). However, there may be any number of memories in the system, each connected to any number of processors. As a non-limiting example, the system may exist within a computing device with a non-uniform memory access (NUMA) architecture, with each processor of the computing device being locally connected, via a cache, to one or more dual inline memory modules (DIMMs), while being non-locally connected to other DIMMs in the system. In such an example, the other DIMMs in the system may be locally connected to caches associated with other processors of the computing device. In one or more embodiments of the invention, each memory (e.g., memory (100)) is operatively connected to one or more caches (e.g., cache A (106), cache N (108)).

In one or more embodiments of the invention, a processor is hardware capable of executing sequences of instructions (e.g., that are stored in operatively connected memory (100), caches (106, 108), etc.) in order to perform operations on and/or otherwise manipulate data. For example, a processor may be made of silicon subjected to a fabrication process by which various circuitry components (e.g., transistors) are created in various regions of a silicon wafer. In one or more embodiments of the invention, the system includes at least two processors (e.g., processor A (102), processor N (104)).

In one or more embodiments of the invention, the system includes one or more caches (106, 108). In one or more embodiments of the invention, a cache (106, 108) is a physical construct for storing data (not shown). In one or more embodiments of the invention, the data may be any type of information and/or instruction relevant to any process, program, and/or application executing on any type of computing device (not shown). For example, the cache (106, 108) may store instructions for a computer processor of a computing device to execute and/or data for the computer processor to use and/or manipulate.

In one or more embodiments of the invention, a cache (106, 108) is associated with and/or operatively connected to one or more processors (102, 104). For example, the cache (106, 108) may be a last-level cache that is operatively connected to a processor via a motherboard of a computing device. As another example, the cache (106, 108) may be included as a part of the processor chip. In one or more embodiments of the invention, the cache (106, 108) includes functionality to operate at higher speeds than other data storage locations accessible to the computer processor (e.g., RAM, hard drive, etc.) and may also be physically closer to the processor with which the cache is associated. In one or more embodiments of the invention, a cache includes and/or is operatively connected to a cache agent (not shown), which may participate in at least a portion of the communication to and/or from a cache.

In one or more embodiments of the invention, a cache (106, 108) includes one or more cache lines (not shown) of any size consistent with one or more embodiments of the invention. For example, a cache line may be configured to hold thirty-two bytes, sixty-four bytes, one hundred and twenty-eight bytes, etc. of data. A cache line may be used to store contents of one or more units (e.g., bytes) of memory, each located at a corresponding memory address, for use by a processor. A cache line may also include identifying information (e.g., tag bits) and one or more flag bits. In one or more embodiments of the invention, the number of cache lines in a cache (106, 108) depends, at least in part, on the size of the cache and the size of the cache lines.

In one or more embodiments of the invention, the cache (106, 108) is accessed (e.g., a cache check/write probe is performed) using at least part of a memory address in order to determine if the contents of the memory at the memory address are present in the cache (106, 108). The memory address may be the address of a memory location that an allocator (110) seeks to access (e.g., in order to perform a write operation).

In one or more embodiments of the invention, the system includes an allocator (110) that is operatively connected to one or more caches and to memory. In one or more embodiments of the invention, an allocator (110) is hardware, software, firmware, and/or any combination thereof that includes functionality to allocate a data stream (not shown). Allocating a data stream may include writing data of the data stream to a location based, at least in part, on various types of information included in the data stream. A data stream may include any sequence of instructions and/or data that is to be written to memory and/or used by a processor, and may include any amount of data (e.g., any number of bytes of data). A data stream may also include any other information, such as, for example, an indication related to the type of allocation to which the data stream should be subjected (e.g., non-allocating, soft allocating, hard allocating), and/or one or more memory addresses associated with the data to be written. Any number of memory addresses, each corresponding to a portion of the data in a data stream, may be included in the data stream and may be associated with the data to which the memory address corresponds. In one or more embodiments of the invention, an allocator is any entity that includes functionality to write data of a data stream directly to memory and/or a cache independently of a processor (e.g., via a DMA operation).

Examples of an allocator include, but are not limited to, a coprocessor and a DMA controller for an input/output (I/O) device (e.g., disk drive, network interface card, host channel adapter, audio device, graphics processing device, etc.). A coprocessor may be any processor that includes functionality to supplement, at least in part, the functionality of a processor of a computing device. A coprocessor may not include all the functionality of a general purpose processor. A coprocessor may be co-located with a processor. Examples of coprocessors include, but are not limited to, graphics processing units (GPUs) and database accelerators.

While FIG. 1 shows a configuration of components, other configurations may be used without departing from the scope of the invention. For example, various components may be combined to create a single component. As another example, the functionality performed by a single component may be performed by two or more components. In one or more embodiments of the invention, one or more of the modules and elements shown in FIG. 1 may be omitted, repeated, and/or substituted. For example, there may be any number caches, or cache partitions, each of which may be operatively connected to any number of processors. As another example, there may be any arrangement and/or quantity of the memory in the system, provided that at least a portion of the memory in the system is operatively connected to one or more processors and to an allocator. Additionally, there may be any number of allocators in the system. In one or more embodiments of the invention, components not shown may exist and/or include those shown in FIG. 1. For example, at least a portion of the components of FIG. 1 may be included in a computing device. For another example, one or more of the components shown in FIG. 1 may be connected via a network on a chip (NOC). Accordingly, embodiments of the invention should not be considered limited to the specific arrangements of modules and elements shown in FIG. 1.

Figure 2A:
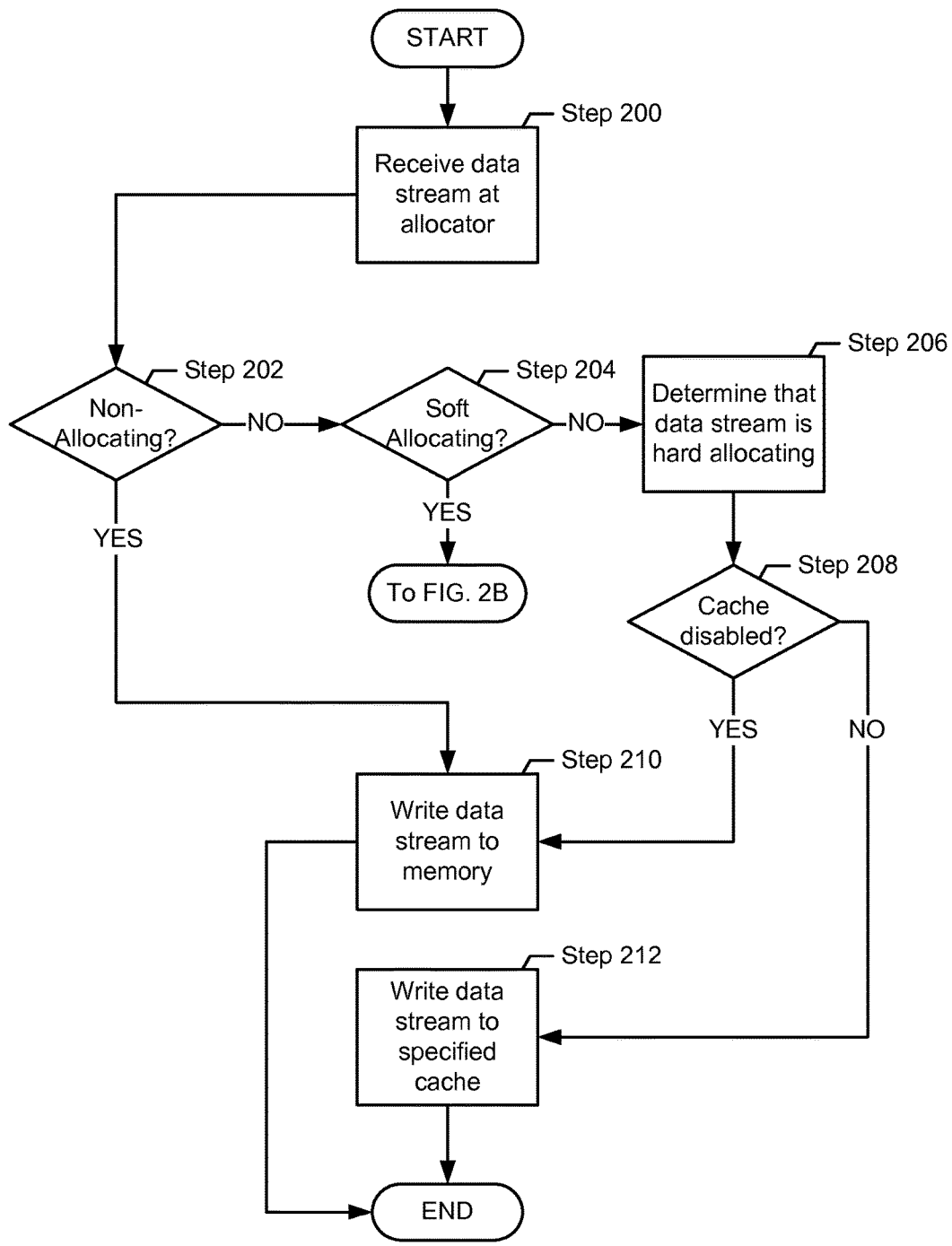
FIG. 2A shows a flowchart in accordance with one or more embodiments of the invention.
Figure 2B:
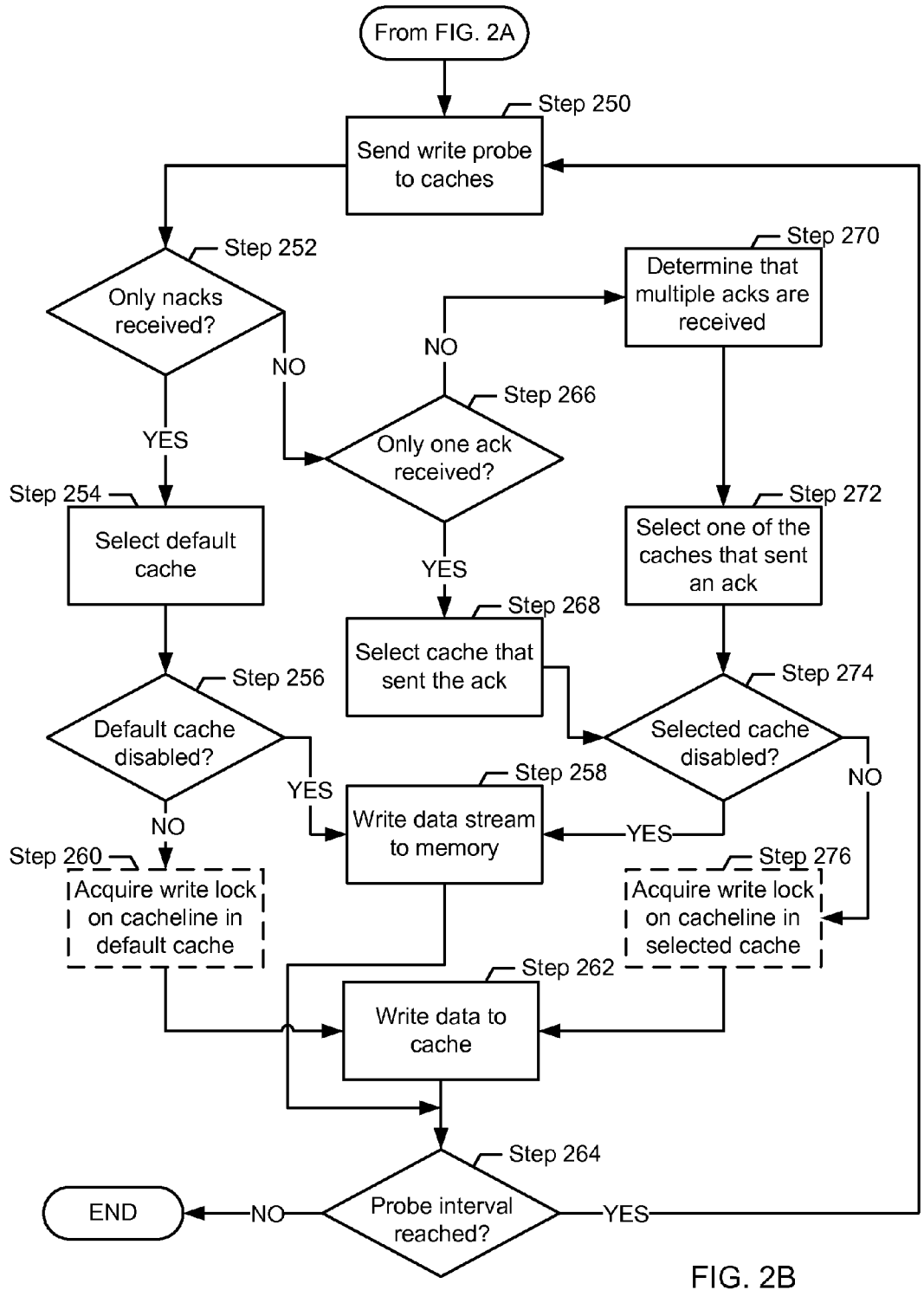
FIG. 2B shows a flowchart in accordance with one or more embodiments of the invention.

FIGS. 2A and 2B show a flowchart in accordance with one or more embodiments of the invention. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively. Additionally, determination steps may be performed by performing a test, such as checking a data value to test whether the value is consistent with the tested condition, or such as checking the state of a device (or a portion thereof) in the system, in accordance with one or more embodiments of the invention.

FIG. 2A shows a flowchart describing a method for receiving a data stream at an allocator. In Step 200, a data stream is received at an allocator. In one or more embodiments of the invention, a data stream is received from any entity that includes functionality to transmit data towards the allocator. For example, the entity may be a host channel adapter (HCA) that provides to the allocator the data stream including data to be written to memory via a DMA operation. As another example, the data stream may be directed to a coprocessor, which may require performing a DMA operation to make data of the data stream available to the processor that the coprocessor supports.

In Step 202, a determination is made as to whether the received data stream is a non-allocating data stream. A non-allocating data stream may be any data stream that includes an indication that the data stream is not to be allocated to a cache, but instead written directly to memory instead. The indication may take any form capable of conveying to the allocator that the data stream is a non-allocating data stream. For example, an indication may reside in header information transmitted to the allocator along with the data as a part of the data stream. If the data stream is a non-allocating data stream, the process proceeds to Step 210. However, if the data stream does not include an indication that the data stream is non-allocating, then the process proceeds to Step 204.

In Step 204, a determination is made as to whether the data stream is a soft allocating data stream. A soft allocating data stream may be any data stream that includes an indication that the data stream may be allocated to a cache that includes data from a memory address included in the data stream. In one or more embodiments of the invention, a data stream with an indication marking the data stream as soft allocating may be allocated by the allocator to a particular cache, based, at least in part, on which cache in a system includes a cache line associated with a memory address for which the data of the data stream is intended. If the data stream includes an indication that the data stream is soft allocating, then the process proceeds to FIG. 2B (discussed below). However, if the data stream is determined to not be soft allocating, then the process proceeds to Step 206.

In Step 206, the allocator determines that the data stream is a hard allocating data stream. In one or more embodiments of the invention, a hard allocating data stream is a data stream that includes an indication that the data stream is hard allocating (i.e., the data stream is to be allocated to a particular specified cache). In one or more embodiments of the invention, the indication may inform the allocator that the data stream is hard allocating, and also to which cache data from the data stream is to be allocated. As an example, a data stream may be hard allocating when it is known which processor, or portion thereof, a consumer process will execute on, allowing the cache associated with the processor to be identified and specified in the data stream received by the allocator.

In Step 208, the allocator determines whether the cache to which the data stream is hard allocated is disabled. In one or more embodiments of the invention, the allocator may use any method to determine whether the specified cache is disabled. For example, if a data stream includes an indication that the data stream is to be hard allocated to cache D, then the allocator may send a request to cache D to acknowledge being enabled. In such an example, if no response is received from cache D within a specified time period, the cache is determined to be disabled and the process proceeds to Step 210. However, if the cache is not determined to be disabled, then the process proceeds to Step 212.

In Step 210, data of the data stream is written to memory at a memory address specified by the data stream. In one or more embodiments of the invention, the data is written to memory instead of to a cache because the data stream received by the allocator either includes an indication that the data stream is non-allocating, or that the data stream is hard-allocating and that the cache to which the data stream is hard allocated is disabled. In one or more embodiments of the invention, writing data of the data stream directly to memory is performed by the allocator (e.g., via a DMA operation). In one or more embodiments of the invention, before the data of the data stream is written to memory the allocator performs one or more write invalidate operations, by which all other copies of the memory to which data is to be written are marked as invalid. Acknowledgement that copies of the data (e.g., located in a cache) are invalidated may be required before the allocator writes the data directly to memory. Writing the data to memory may include, for example, modifying the bits of one or more bytes of memory such that the bytes represent the data being written. In one or more embodiments of the invention, once the data is written to memory, the process ends.

In Step 212, data of the data stream is written to the specified cache. In one or more embodiments of the invention, the data is written to a cache line of a cache that is specified by the data stream as the cache to which the data stream is to be hard allocated. The cache line to which the data is written may be associated with a memory address included in the data stream. In one or more embodiments of the invention, once the data is written to the specified cache, the process ends.

FIG. 2B shows a flowchart describing a method for receiving a soft allocating data stream at an allocator. In Step 250, based at least in part on having determined that the data stream is soft allocating (e.g., in Step 204 of FIG. 2A), the allocator sends a write probe to one or more operatively connected caches. In one or more embodiments of the invention, a write probe is a query sent to the caches to determine which caches, if any, include a cache line associated with a memory address for which the data of the data stream is intended. Responses to a write probe may include an acknowledgement ("ack"), indicating that the cache includes a cache line corresponding to a memory address of the data stream. On the other hand, responses to a write probe may instead include a negative acknowledgement ("nack"), indicating that the cache does not include a cache line corresponding to a memory address of the data stream. The cache may receive and/or respond to the query from the allocator via a cache agent, or may include functionality to receive and/or respond to the query directly.

In Step 252, a determination is made as to whether only nacks were received by the allocator from the one or more caches to which a write probe was sent in Step 250. In one or more embodiments of the invention, only nacks are received when each cache to which a write probe is sent responds indicating that the cache does not include a cache line corresponding to a memory address of the data stream. For example, if no process executing on a computing device, or that could be executing on a computing device, has used data stored at a particular memory address (at least recently), then the computing device may include no caches that include a cache line in which the data from the memory address is written, and/or has been modified. For another example, any instances of a cache line corresponding to a given memory address may have previously been evicted from the cache and, if modified while in the cache, written back to memory at the memory address. If only nacks are received, the process proceeds to Step 254. If, on the other hand, any acks were received from any caches, the process proceeds to Step 266.

In Step 254, a default cache is selected in response to the receipt of only nacks in response to the one or more write probes issued by the allocator. In one or more embodiments of the invention, an allocator may be configured such that a default cache is specified as the cache to which data is to be written in the event that a soft allocating data stream is received, but no cache in the system includes a cache line corresponding to a memory address of the data stream. The default cache may be any cache of a computing device to which the allocator is operatively connected and to which the allocator is capable of writing data.

In Step 256, the allocator determines whether the default cache selected in Step 254 is disabled. In one or more embodiments of the invention, the allocator may use any method to determine whether the specified cache is disabled. For example, if the default cache is cache A of a computing device, then the allocator may send a request to cache A to acknowledge being enabled. In such an example, if no response is received from cache D within a specified time period, the cache is determined to be disabled. If the default cache is determined to be disabled, the process proceeds to Step 258. However, if the default cache is not determined to be disabled (i.e., the default cache is enabled), then the process proceeds to Step 260.

In Step 260, the allocator acquires a write lock on one or more cache lines in the default cache corresponding to one or more memory addresses of the data stream. In one or more embodiments of the invention, the allocator acquires a write lock by sending (e.g., via a NOC) a write allocate request to the default cache. In embodiments of the invention in which credit-based flow control is implemented, the allocator may require sufficient credits to send write allocate requests (and/or write probes) to a cache. In one or more embodiments of the invention, a write allocate request informs the cache that the allocator wishes to write data to one or more cache lines of the cache based on one or more memory addresses of the data stream. The write allocate request may be sent in any form (e.g., a packet) capable of conveying to the cache that the allocator seeks to perform one or more write operations.

In response to the write allocate request, the cache may send (e.g., via a NOC operatively connecting at least a portion of the caches of a computing device) one or more lock notifications. In one or more embodiments of the invention, a write lock is acquired when each cache that received a lock notification responds with an acknowledgement that the cache sending the lock notification may have a write lock on the one or more memory addresses specified by the lock notification. Once a write lock is acquired by the cache in response to the write allocate request from the allocator, the process may proceed to Step 262.

One of ordinary skill in the relevant art, having the benefit of this disclosure, will recognize that Step 260 may optionally not be required in the event that the default cache already has a lock corresponding to the necessary memory addresses.

Returning to Step 266, a determination is made as to whether only a single ack is received in response to the write probes sent by the allocator to each operatively connected cache in Step 250. In one or more embodiments of the invention, if more than one ack is received from caches by the allocator, the process proceeds to Step 270. In one or more embodiments of the invention, if only one cache responds to a write probe with an ack, then the process proceeds to Step 268.

In Step 268, a cache is selected based on the receipt of an ack from one cache in response to the one or more write probes issued by the allocator. In one or more embodiments of the invention, one cache responding to a write probe with an ack indicates that the cache sending the ack includes a cache line associated with a memory address of the data stream that corresponds to one or more units (e.g., bytes) of data of the data stream. Once the cache sending the ack is selected by the allocator, the process proceeds to Step 274.

Returning to Step 270, the allocator determines that multiple acks were received in response to the write probes sent to the various caches in Step 250. In one or more embodiments of the invention, multiple acks are received when more than one cache holds a copy of the data of a given memory address in a cache line. Any number of caches may respond to a write probe with an ack.

In Step 272, one cache of the multiple caches that responded to a write probe with an ack, as determined in Step 270, is selected by the allocator. The cache may be selected based on any cache selection scheme that the allocator is configured to implement. For example, the caches of a computing device may be numbered, and the allocator may be configured to select the cache assigned the lowest number. For another example, the allocator may be configured to randomly select the cache from among the caches that responded to the write probe with an ack.

In Step 274, a determination is made as to whether the selected cache (i.e., the cache selected in either Step 268 or Step 272) is disabled. In one or more embodiments of the invention, the allocator may use any method to determine whether the specified cache is disabled. For example, if the selected cache is cache A of a computing device, then the allocator may send a request to a cache agent of cache A to determine if cache A is enabled. If the selected cache is determined to be disabled, the process proceeds to Step 258. However, if the selected cache is not determined to be disabled (i.e., the selected cache is enabled), then the process proceeds to Step 276.

In Step 276, the allocator acquires a write lock on one or more cache lines in the selected cache corresponding to memory addresses of the data stream. In one or more embodiments of the invention, the allocator acquires a write lock in substantially the same manner through which the write lock is acquired by the allocator in Step 260 (described above). One of ordinary skill in the relevant art, having the benefit of this disclosure, will recognize that Step 276 may optionally not be required in the event that the selected cache already has a write lock on the necessary one or more memory addresses. One of ordinary skill in the relevant art, having the benefit of this disclosure, will recognize that Step 276 may optionally not be required in the event that the selected cache already has a lock corresponding to the necessary memory addresses.

Returning to Step 258, data of the data stream is written by the allocator to memory at a memory address specified by the data stream. In one or more embodiments of the invention, the data is written to memory instead of to a cache because either the default cache or the selected cache is determined to be disabled (e.g., in Step 256 or Step 274, respectively). In one or more embodiments of the invention, writing data of the data stream directly to memory is performed by the allocator (e.g., via a DMA operation). In one or more embodiments of the invention, before the data of the data stream is written to memory, the allocator performs write invalidate operations by which all other copies of the memory (e.g., copies in other caches) to be written to are marked as invalid. Acknowledgement that copies of the data are invalidated may be required before the allocator writes the data directly to memory. Writing the data to memory may include modifying the bits of one or more bytes of memory such that the bytes represent the data being written. In one or more embodiments of the invention, once at least a portion of the data from the data stream is written to memory, the process proceeds to Step 264.

Turning to Step 262, data of the data stream is written to the cache (i.e., either the default cache selected in Step 254, or a selected cache of Step 268 or 272 that responded to a write probe with an ack). Any amount of data from the data stream may be written to the cache. The cache line to which data is written may be associated with a memory address included in the data stream. In one or more embodiments of the invention, once the data is written to the specified cache, the process proceeds to Step 264.

In Step 264, a determination is made as to whether a probe interval has been reached. In one or more embodiments of the invention, a probe interval is an interval within which an allocator will continue to write data of a data stream to a cache and after which an allocator is configured to re-send write probes to the caches. In one or more embodiments of the invention, when an allocator is directing a data stream to a cache, the data stream may include any number of units of data, each associated with a memory address. Therefore, writing data from the data stream to the cache (i.e., as in Step 262, above) may include multiple writes and may be to multiple cache lines identified by any number of memory addresses.

In one or more embodiments of the invention, the allocator is configured to write data from a data stream to a given cache only until a probe interval is reached. The probe interval may be configured for the allocator and may be any interval. For example, the probe interval may be a defined period of time. As another example, the probe interval may be a specified number of writes to a cache. Additionally, the probe interval may be different, depending on whether one or more acks were received by the allocator in response to the write probes sent in Step 250. For example, if only nacks were received, the probe interval may be a specified fraction (e.g., one-half) of the probe value used when any ack was received.

The probe interval may be configured so that the allocator is forced, while writing data from a data stream to a cache, to periodically and/or aperiodically determine whether a more optimal cache exists in the computing device to which the data may be written. A more optimal cache may be a cache more closely associated with (e.g., directly connected to) a processor on which a computing process that is consuming the data is executing. In one or more embodiments of the invention, if the probe interval is reached, the process returns to Step 250, and the allocator re-sends out a write probe to each operatively connected cache. In one or more embodiments of the invention, if the probe interval has not yet been reached, the process ends.

Figure 3A:
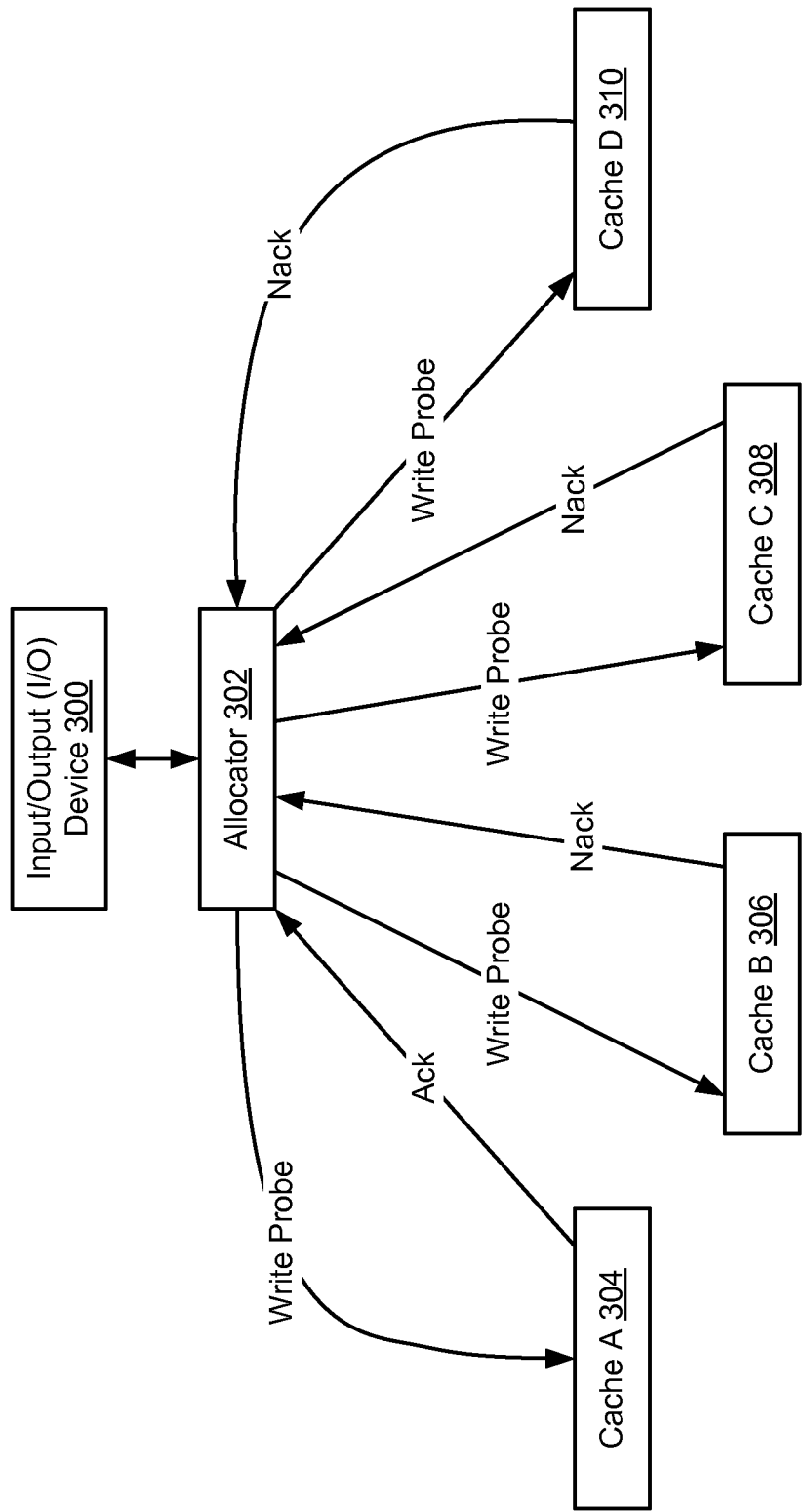
FIG. 3A and FIG. 3B show an example in accordance with one or more embodiments of the invention.
Figure 3B:
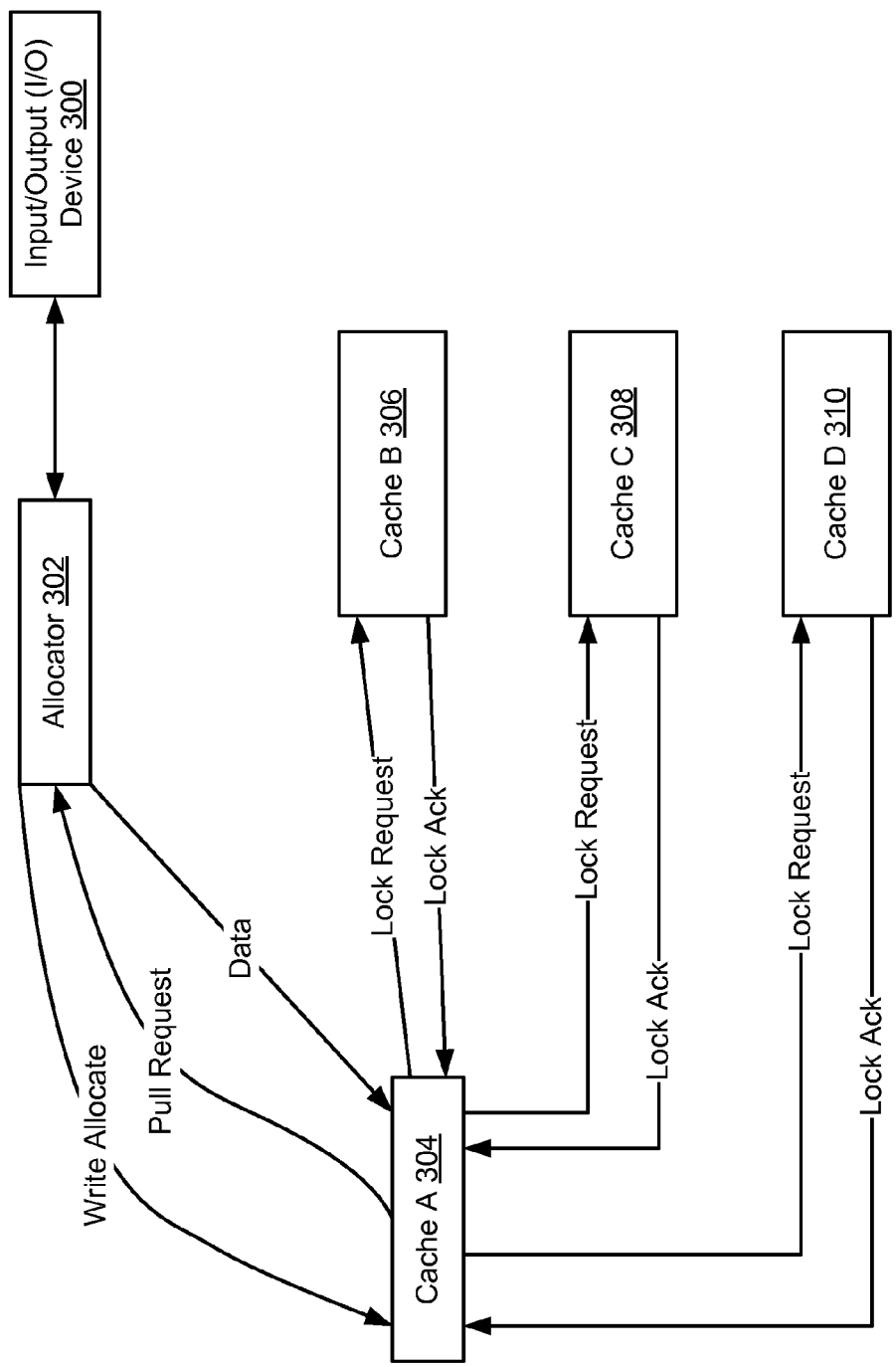
Figure 4:
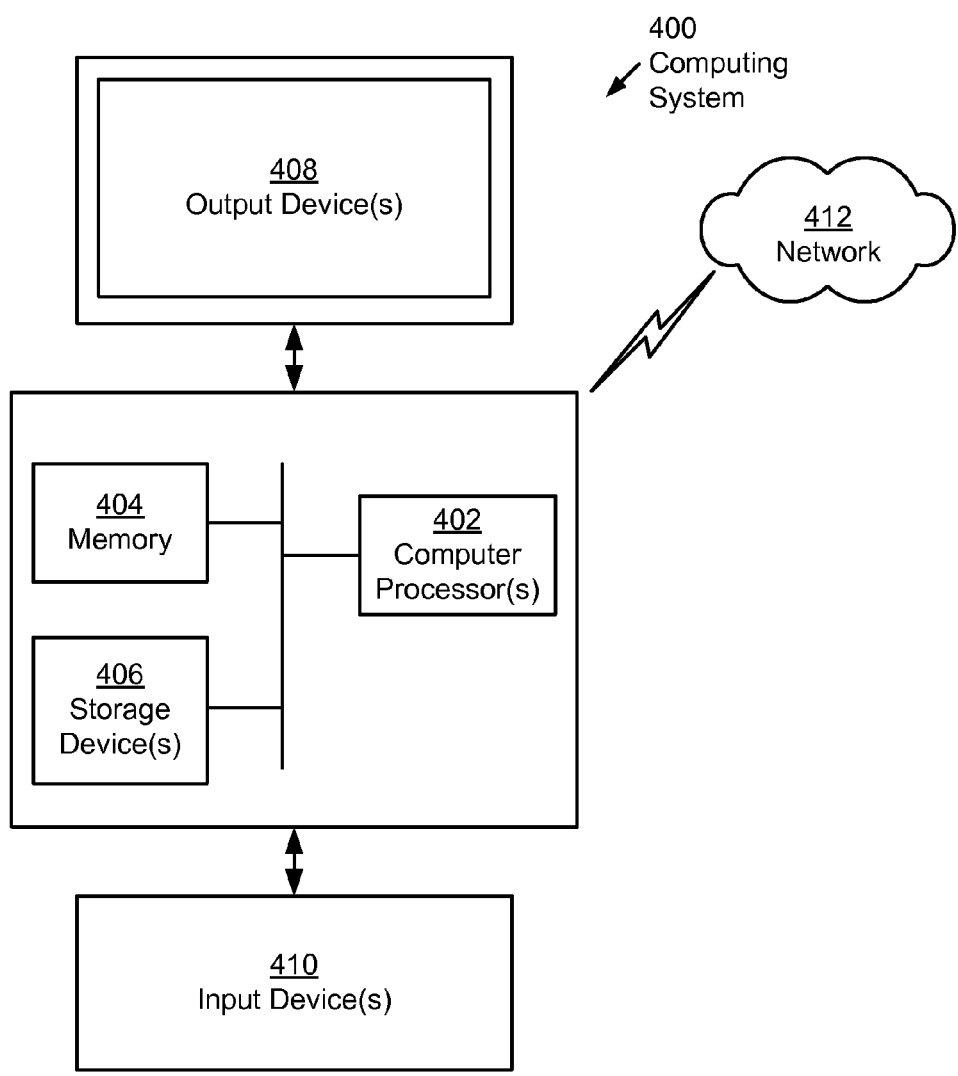
FIG. 4 shows a computing system in accordance with one or more embodiments of the invention.

FIGS. 3A and 3B show an example in accordance with one or more embodiments of the invention. The following example is for explanatory purposes only and not intended to limit the scope of the invention.

Referring to FIGS. 3A and 3B, consider a scenario in which an allocator (302) is configured to allocate DMA requests on behalf of an I/O device (300). In such a scenario, the allocator (302) is operatively connected to the I/O device (300) and includes functionality to receive data streams from the I/O device. The allocator is also operative connected to cache A (304), cache B (306), cache C (308), and cache D (310). Each cache in the present example corresponds to one processor (not shown), and each cache corresponds to a different processor. Additionally, each cache and the allocator (302) are operatively connected to memory (not shown).

In such a scenario, a data stream is received from the I/O device (300) at the allocator (302). The data stream includes forty-eight bytes of data, each associated with a different memory address. The allocator examines the data stream and determines that the data stream includes an indication that the data stream is soft allocating. In response to the data stream being soft allocating, the allocator transmits a write probe to cache A (304), cache B (306), cache C (308), and cache D (310), as shown in FIG. 3A. The write probes include a query as to whether the cache includes a cache line corresponding to a memory address of the data stream (e.g., the memory address associated with the first byte of data in the data stream).

In response to the write probes, cache B (306), cache C (308), and cache D (310) each respond with a nack, indicating to the allocator that cache B, cache C, and cache D do not include a cache line corresponding to the memory address included in the write probe. Cache A (304) responds to the write probe with an ack, acknowledging that cache A does include a cache line corresponding to the memory address included in the write probe.

The allocator (302) then determines whether cache A is enabled to receive allocating writes. If cache A is disabled, then the allocator writes the data of the data stream to memory after performing one or more write invalidate operations. However, in the present example, the allocator determines that cache A is, in fact, enabled.

In response to receiving an ack from cache A (304), and determining that cache A is enabled, the allocator (302) sends a write allocate request to cache A, as shown in FIG. 3B. In response to receiving the write allocate request, cache A issues a lock request requesting a write lock on the memory address included in the write probe to cache B (306), cache C (308), and cache D (310), each of which return a lock ack, acknowledging that cache A may have a write lock on the memory address. One having ordinary skill in the relevant art and having the benefit of this disclosure will understand that although lock requests are shown in FIG. 3B and described herein, lock requests may not be necessary for a given cache to send once a determination is made that the given cache already includes the cache line corresponding to the memory address included in the write probe.

Once a lock ack is received from each of the other three caches in the present example, cache A (304) transmits a pull request to the allocator (302). The pull request indicates to the allocator that the cache has acquired the necessary write lock and is ready to begin receiving data of the data stream. Once the pull request is received, the allocator begins transmission of data from the data stream to cache A, where the data is written into the appropriate location in the cache line corresponding to the memory address that was previously included in the write probe. Writing the data will continue until a probe interval is reached. In the present example, the probe interval is configured to be sixteen bytes of data. Accordingly, after sixteen bytes are transmitted and written to cache A, the allocator ceases transmitting data of the data stream to cache A, and instead resends a new write probe to cache A, cache B, cache C, and cache D, to determine if cache A is still the more optimal cache to which data is to be transmitted.

Embodiments of the invention may be implemented on a computing system. Any combination of mobile, desktop, server, embedded, or other types of hardware may be used. For example, as shown in FIG. 5, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for allocating a plurality of data streams, comprising:
    receiving, at an allocator, a first data stream comprising a first memory address and first data associated with the first memory address;
    examining, by the allocator, the first data stream to make a first determination that the first data stream is a soft allocating data stream;
    sending, from the allocator based on the first determination, a plurality of write probes to a plurality of caches, wherein each write probe of the plurality of write probes comprises at least part of the first memory address;
    receiving a second data stream at the allocator, wherein the second data stream comprises a second memory address and second data associated with the second memory address;
    examining, by the allocator, the second data stream to make a second determination that the second data stream is a second soft allocating data stream;
    sending from the allocator, based on the second determination, a second plurality of write probes to the plurality of caches, wherein each write probe of the second plurality of write probes comprises at least part of the second memory address;
    receiving, in response to the second plurality of write probes, a plurality of cache line present negative acknowledgements, wherein each cache of the plurality of caches responds with one cache line present negative acknowledgement of the plurality of cache line present negative acknowledgements;
    receiving, at the allocator in response to a first write probe of the plurality of write probes, a cache line present acknowledgement from a first cache of the plurality of caches; and
    directing, by the allocator in response to the cache line present acknowledgement, the first data of the first data stream to the first cache.

2. The method of claim 1, further comprising, before directing the first data of the first data stream to the first cache, obtaining a write lock on a cache line of the first cache corresponding to the first memory address.

3. The method of claim 2, further comprising, before obtaining the write lock, sending to the first cache, from the allocator, a write allocate request, wherein the write lock is obtained by the first cache in response to the write allocate request.

4. The method of claim 3, wherein obtaining the write lock comprises, in response to the write allocate request, the first cache sending a lock notification to each other cache of the plurality of caches, and receiving, in response to the lock notifications, lock acknowledgements from each other cache.

5. The method of claim 1, further comprising, after directing the first data of the first data stream to the first cache:
    making a second determination that a probe interval is reached; and
    sending, in response to the second determination, a second plurality of write probes to the plurality of caches.

6. The method of claim 1, further comprising, before directing the first data of the first data stream to the first cache, making a second determination that the first cache is enabled.

7. The method of claim 1, wherein the cache line present acknowledgement comprises an indication that the first cache comprises a cache line corresponding to the first memory address.

8. The method of claim 1, further comprising:
    making a third determination that a default cache is enabled; and
    directing, based on the third determination and the plurality of cache line present negative acknowledgements, the second data of the second data stream to the default cache.

9. The method of claim 1, further comprising:
    making a third determination that a default cache is disabled; and
    writing, based on the third determination and the plurality of cache line present negative acknowledgements, the second data of the second data stream to memory at the second memory address.

10. The method of claim 1, further comprising:
    receiving a second data stream at the allocator, wherein the second data stream comprises a second memory address and second data associated with the second memory address;
    examining, by the allocator, the second data stream to make a second determination that the second data stream is a second soft allocating data stream;
    sending from the allocator, based on the second determination, a second plurality of write probes to the plurality of caches, wherein each write probe of the second plurality of write probes comprises at least part of the second memory address;
    receiving, in response to the second plurality of write probes, a second cache line present acknowledgement from a second cache of the plurality of caches;
    making a third determination that the second cache is disabled; and
    writing, based on the third determination, the second data of the second data stream to memory at the second memory address.

11. A system for allocating a plurality of data streams comprising:
    a memory;
    a plurality of caches, wherein each of the plurality caches is operatively connected to at least one processor; and
    an allocator operatively connected to the memory and to the plurality of caches and configured to:

receive a first data stream comprising a first memory address and first data associated with the first memory address;
examine the first data stream to make a first determination that the first data stream is a soft allocating data stream;
send, based on the first determination, a plurality of write probes to the plurality of caches, wherein each write probe of the plurality of write probes comprises at least part of the first memory address;
receive, in response to a first write probe of the plurality of write probes, a cache line present acknowledgement from a first cache of the plurality of caches;
receive a second data stream comprising a second memory address and second data associated with the second memory address;
examine the second data stream to make a second determination that the second data stream is the soft allocating data stream;
send, based on the second determination, a second plurality of write probes to the plurality of caches, wherein each write probe of the second plurality of write probes comprises at least part of the second memory address;
receive, in response to the second plurality of write probes, a plurality of cache line present negative acknowledgements, wherein each cache of the plurality of caches responds with one cache line present negative acknowledgement of the plurality of cache line present negative acknowledgements; and
direct, in response to the cache line present acknowledgement, the first data of the first data stream to the first cache.

12. The system of claim 11, wherein the allocator is further configured to, before directing the first data of the first data stream to the first cache, obtain a lock on a cache line of the first cache corresponding to the first memory address.

13. The system of claim 12, wherein the allocator is further configured to, before obtaining the lock, send to the first cache, a write allocate request, wherein the lock is obtained in response to the write allocate request.

14. The system of claim 13, wherein obtaining the lock comprises, in response to the write allocate request, the first cache sending a lock notification to each other cache of the plurality of caches, and receiving, in response to the lock notifications, lock acknowledgements from each other cache.

15. The system of claim 11, wherein the allocator is further configured to, after directing the first data of the first data stream to the first cache:
make a second determination that a probe interval is reached; and
send, in response to the second determination, a second plurality of write probes to the plurality of caches.

16. The system of claim 11, wherein the allocator is operatively connected to and allocates direct memory access requests for an input/output device.

17. The system of claim 11, wherein the allocator is further configured to, before directing the first data of the first data stream to the first cache, make a second determination that the first cache is enabled.

18. A non-transitory computer readable medium comprising instructions, which, when executed by a computer processor, perform a method comprising:
receiving, at an allocator, a first data stream comprising a first memory address and first data associated with the first memory address;
examining, by the allocator, the first data stream to make a first determination that the first data stream is a soft allocating data stream;
receiving a second data stream at the allocator, wherein the second data stream comprises a second memory address and second data associated with the second memory address;
examining, by the allocator, the second data stream to make a second determination that the second data stream is a second soft allocating data stream;
sending from the allocator, based on the second determination, a second plurality of write probes to the plurality of caches, wherein each write probe of the second plurality of write probes comprises at least part of the second memory address;
receiving, in response to the second plurality of write probes, a second cache line present acknowledgement from a second cache of the plurality of caches;
making a third determination that the second cache is disabled;
writing, based on the third determination, the second data of the second data stream to memory at the second memory address;
sending from the allocator, based on the first determination, a plurality of write probes to a plurality of caches, wherein each write probe of the plurality of write probes comprises at least part of the first memory address;
receiving at the allocator, in response to a first write probe of the plurality of write probes, a cache line present acknowledgement from a first cache of the plurality of caches; and
directing, by the allocator, in response to the cache line present acknowledgement, the first data of the first data stream to the first cache.

19. The non-transitory computer readable medium of claim 18, wherein the method further comprises: before directing the first data of the first data stream to the first cache, obtaining a write lock on a cache line of the first cache corresponding to the first memory address.

20. The non-transitory computer readable medium of claim 19, wherein the method further comprises: before obtaining the write lock, sending to the first cache, from the allocator, a write allocate request, wherein the write lock is obtained by the first cache in response to the write allocate request.

* * * * *